Figure 2:
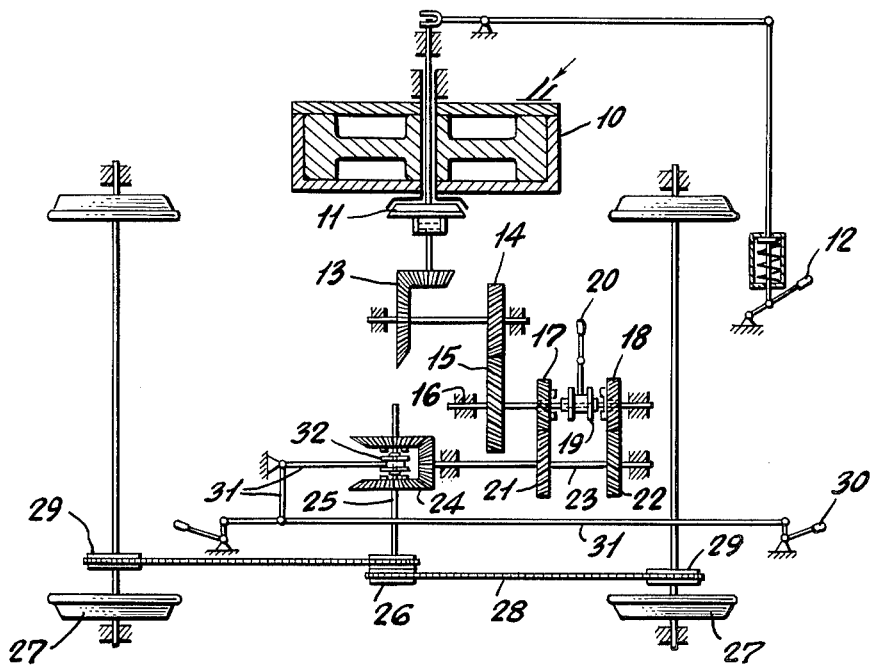

March 8, 1966  N. G. MINENKO ETAL  3,238,896
LOCOMOTIVE WITH ENERGY ACCUMULATOR IN THE FORM
OF A REVOLVING FLYWHEEL
Filed June 3, 1963  2 Sheets-Sheet 1
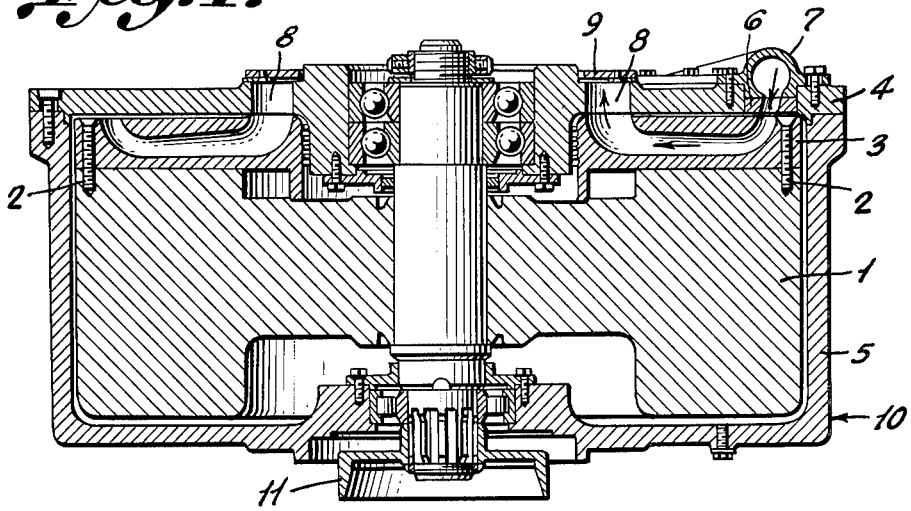
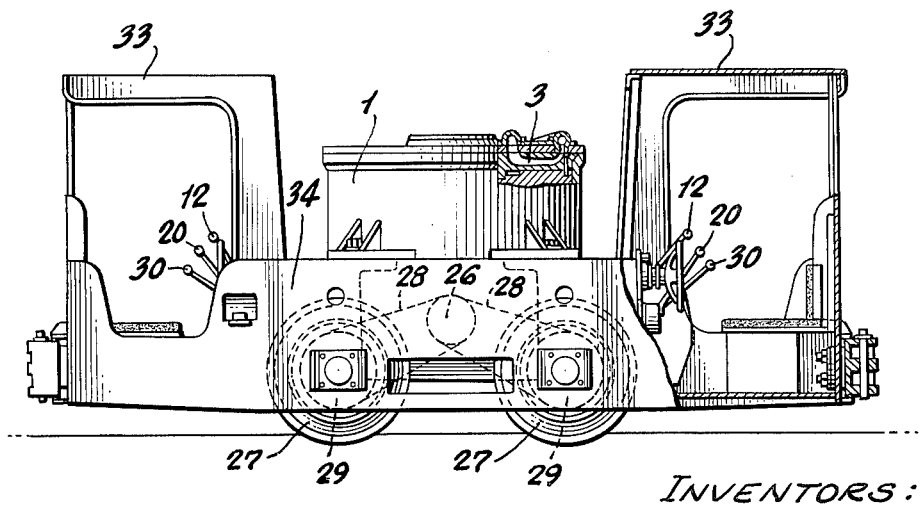
INVENTORS:
N. G. MINENKO
V. V. SALATSINSKY
A. N. LIPAKOV
A. P. TKALENKO
I. I. KIRILLOV
R. I. DJAKONOV
BY
ATTORNEYS March 8, 1966

N. G. MINENKO ETAL  3,238,896
LOCOMOTIVE WITH ENERGY ACCUMULATOR IN THE FORM
OF A REVOLVING FLYWHEEL

Filed June 3, 1963

2 Sheets-Sheet 2

INVENTORS:
N. G. MINENKO
V. V. SALATSINSKY
A. N. LIPAKOV
A. P. TKALENKO
I. I. KIRILLOV
R. I. DJAKONOV

BY Glascock, Downing & Seebold
ATTORNEYS

United States Patent Office 3,238,896
Patented Mar. 8, 1966

3,238,896
LOCOMOTIVE WITH ENERGY ACCUMULATOR IN THE FORM OF A REVOLVING FLYWHEEL
Nickolai Gavrilovich Minenko, Vladimir Vladimirovich Salatsinsky, Alexey Nikandrovich Lipakov, and Anatoly Petrovich Tkalenko, Druzhkovka, Ivan Ivanovich Kirillov, Leningrad, and Rostislav Ivanovich Djakonov, Brjansk, U.S.S.R., assignors to Toretsky Gosudarstrenny Mashinostriotelny Zavod
Filed June 3, 1963, Ser. No. 285,091
2 Claims. (Cl. 105—26)

This invention relates to locomotives with an energy accumulator in the form of a revolving flywheel and with a charging engine, the locomotives being designed in the main for operation in shafts in which dust or gas explosion hazard is present.

Such locomotives are known wherein an air or hydraulic gear engine that transmits the torque to the flywheel through a reduction gear is employed as the charging engine. There are also known locomotives wherein an electric motor that transmits the torque to the flywheel through a power transmission is employed as the charging engine.

The drawbacks of these known locomotives include the complicated design of the engine and the intermediate power transmission, the low efficiency of the charging engine and the low total charging efficiency, the necessity of frequently lubricating the bearings and mated parts, the impossibility of installing a second locomotive driver's cab to improve the field of view when running backward, as well as the high initial outlay and operating costs for these locomotives. Besides this, locomotives with an electric charging motor do not ensure the required safety against explosions.

An aim of this invention is the creation of a locomotive having a charging engine of a simplified design and with a sufficiently high efficiency.

Another aim of this invention is the creation of a locomotive wherein the torque is transmitted from the charging engine to the accumulator flywheel directly, without employing any intermediate power transmission, which together with increasing the general efficiency of charging would also permit a reduction in the size of the locomotive and permit the installation of a second driver's cab to improve the field of view when running backward.

An aim of the invention is also the reduction of the initial outlay and the operating costs of the locomotive. In addition, the invention also ensures an increased resistance to wear of the entire locomotive power plant.

All the aims indicated above are attained by employing as the charging engine a low-pressure air turbine, which is powered by the low-pressure compressed air from the duct supplying air to the shaft in which the locomotive operates. This prime mover or locomotive has no gearing nor mated parts, which considerably simplifies its design, reduces the cost of manufacture and increases the efficiency. The turbine wheel is secured to the face of the flywheel and is mounted on the same axle as the latter. This has increased the total charging efficiency, reduced the dimensions of the locomotive and made it possible to install a second driver's cab. The use of the protective housing of the flywheel, to the lid of which the nozzles and the air manifold are attached, as the turbine stator also leads to simplification of design and an increase in the wear-resistance of the prime mover.

Further objects and advantages of the invention will be apparent from the following description taken in conjunction with the accompanying drawings:

FIG. 1 shows a sectional view of the charging turbine with the flywheel; FIG. 2 contains a diagram of the running gear of the proposed locomotive, while FIG. 3 depicts a side view of the locomotive with the charging engine, flywheel and driver's cabs.

Turbine wheel 3 of a low-pressure air turbine is secured with screws 2 to the face of flywheel 1. Nozzles 6 and intake air manifold 7 are secured on lid 4 of protective housing 5 of flywreel 1. Turbine discharge ports 8 during uncranking of the flywheel are closed by means of lids 9, this reducing the loss of power and cutting down noise when air is being sucked in by the turbine wheel.

Upon completion of charging, engine 10 is connected through tapered clutch 11 with the aid of handle 12 to bevel gears 13 of the reduction gear that transmits the rotary motion to spur gear 14 engaged with gear wheel 15. The latter is rigidly mounted on shaft 16, on which are freely mounted gear wheels 17 and 18, of the gear shifting device, which are shifted by clutch 19 controlled by lever 20. Gear wheels 17 and 18 transmit motion correspondingly to gear wheels 21 and 22, engaged with them and rigidly fitted on the shaft 23.

Shaft 23 communicates motion to the conic gear of the reverse-gear 24, on transverse shaft 25 on which there are rigidly secured sprockets 26 that transmit motion to locomotive wheels 27 through chains 28 and sprockets 29, the latter being rigidly fitted on the axles of the locomotive wheels. The motion of the locomotive is reversed by means of lever 30 through a system of rods 31 that change the position of clutch 32 of the reverse-gear 24.

The locomotive is controlled from either of the two driver's cabs 33 (depending on the direction of travel), mounted on frame 34 of the locomotive. The possibility of installing two cabs is ensured by the small dimensions of the proposed charging engine.

Although the present invention has been described in accordance with the proposed way of realising it, there may be alterations and variations that do not deviate from the ideas and the scope of the invention. For example, a turbine alternative can be used wherein the turbine wheel is disengaged from the flywheel when the latter is being uncranked. Instead of the centripetal air turbine a different type of air turbine, for instance a Terry turbine, may be employed.

Such alterations and variations are not considered to be beyond the scope of the present invention and the claims listed below.

What we claim is:
1. A locomotive comprising a frame, supporting and driving wheels rotatably mounted on said frame, power transmission means connected to said wheels for driving the same, a releasable clutch connected to said transmission means, a flywheel connected to said clutch, a low pressure turbine rotor rigidly mounted on one radial face of said flywheel, a cup-shaped housing enclosing the radial face of said flywheel opposite said rotor and the periphery of said flywheel, a removable lid secured to said housing and enclosing said rotor, a gas-air pressure manifold on said lid, nozzles carried by said lid and communicating with said manifold for directing gas-air pressure to said rotor to rotate said flywheel and store energy therein, and said lid having gas-air pressure exhaust outlets therein, said flywheel and the energy stored therein providing the sole means for driving said wheels.

2. A locomotive as defined in claim 1, in which means is provided for selectively closing or opening said exhaust outlets.

References Cited by the Examiner

UNITED STATES PATENTS

| | | | |
|---|---|---|---|
| 938,253 | 10/1906 | Lawson | 253—39.1 |
| 1,484,597 | 2/1924 | Watkins | 230—127 |
| 1,687,541 | 10/1928 | Carmichael | 230—135 |
| 2,690,132 | 9/1954 | Misch | 253—771 |
| 2,772,538 | 12/1956 | Ullery | 103—155 |
| 2,803,430 | 8/1957 | Wheaton et al. | 253—55 |
| 2,911,786 | 11/1959 | Kelley | 103—115 |

FOREIGN PATENTS

| | | |
|---|---|---|
| 15,211 | 1908 | Great Britain. |
| 144,519 | 4/1961 | Russia. |

ARTHUR L. LA POINT, *Primary Examiner.*

JOSEPH H. BRANSON, Jr., LEO QUACKENBUSH, MILTON BUCHLER, *Examiners.*